United States Patent
Chheda et al.

(10) Patent No.: US 11,010,361 B1
(45) Date of Patent: May 18, 2021

(54) EXECUTING CODE ASSOCIATED WITH OBJECTS IN A HIERARCHIAL DATA STRUCTURE

(71) Applicant: Amazon Technologies, Inc., Seattle, WA (US)

(72) Inventors: Mahendra Manshi Chheda, Sammamish, WA (US); James Robert Englert, Seattle, WA (US); Christopher Ryan Baker, Seattle, WA (US); Alazel Acheson, Redmond, WA (US); Srikanth Mandadi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 441 days.

(21) Appl. No.: 15/475,007

(22) Filed: Mar. 30, 2017

(51) Int. Cl.
  *G06F 16/22* (2019.01)
  *G06F 9/448* (2018.01)
  *G06F 16/21* (2019.01)
  *G06F 16/28* (2019.01)

(52) U.S. Cl.
  CPC ........ *G06F 16/2246* (2019.01); *G06F 9/4488* (2018.02); *G06F 16/212* (2019.01); *G06F 16/282* (2019.01)

(58) Field of Classification Search
  CPC .. G06F 16/2246; G06F 9/4488; G06F 16/282; G06F 16/212; G06F 16/213
  USPC ........................................................ 707/756
  See application file for complete search history.

(56) References Cited

U.S. PATENT DOCUMENTS

| | | | |
|---|---|---|---|
| 6,151,610 A * | 11/2000 | Senn ...................... | G06F 16/93 715/236 |
| 6,714,952 B2 * | 3/2004 | Dunham ............. | G06F 11/1464 707/645 |
| 6,718,535 B1 * | 4/2004 | Underwood ........... | G06F 9/451 717/101 |
| 6,721,758 B1 * | 4/2004 | Jex ........................ | G06F 16/289 |
| 6,769,124 B1 | 7/2004 | Schoening et al. | |
| 6,785,689 B1 * | 8/2004 | Daniel ..................... | G06F 16/25 707/754 |
| 6,980,995 B2 * | 12/2005 | Charlet ................. | G06F 16/248 |
| 6,986,121 B1 * | 1/2006 | Boshier ..................... | G06F 8/71 717/108 |

(Continued)

OTHER PUBLICATIONS

U.S. Appl. No. 15/475,024, filed Mar. 30, 2017, Mahendra Manshi Chheda, et al.

(Continued)

*Primary Examiner* — Hanh B Thai
(74) *Attorney, Agent, or Firm* — Robert C. Kowert; Kowert, Hood, Munyon, Rankin & Goetzel, P.C.

(57) ABSTRACT

Code may be associated with one or more objects in a hierarchical data structure for execution. An access request for an object in the hierarchical data structure may be received. A schema applicable to the hierarchical data structure may be accessed and evaluated to identify code associated with the object. The code may be executed and servicing of the access request may be performed based, at least in part, on a result of executing the code. Code may be received and stored for inclusion in the schema, in some embodiments. Code may be executed by requesting execution of code that is stored and executed at a remote execution platform, in some embodiments.

20 Claims, 10 Drawing Sheets

(56) References Cited

U.S. PATENT DOCUMENTS

| | | | | |
|---|---|---|---|---|
| 7,275,235 | B2* | 9/2007 | Molinari | G01R 13/345 717/100 |
| 7,603,393 | B1 | 10/2009 | Cote et al. | |
| 7,721,194 | B2* | 5/2010 | Ozzie | G06F 40/221 715/234 |
| 7,809,672 | B1* | 10/2010 | Tenorio | G06Q 30/0629 705/26.64 |
| 7,822,711 | B1 | 10/2010 | Ranade | |
| 7,836,438 | B1* | 11/2010 | Nikolov | G06F 8/52 717/111 |
| 7,840,647 | B2* | 11/2010 | Kloba | H04W 4/00 709/217 |
| 7,882,155 | B2* | 2/2011 | Meadows | G06F 40/14 707/811 |
| 7,904,949 | B2* | 3/2011 | Bowers | H04L 63/0884 380/255 |
| 8,086,643 | B1* | 12/2011 | Tenorio | G06Q 30/0623 707/802 |
| 8,099,671 | B2* | 1/2012 | Arthursson | G06F 9/45504 715/760 |
| 8,626,803 | B2* | 1/2014 | Hsu | G06F 16/972 707/807 |
| 8,839,262 | B2* | 9/2014 | Ripberger | G06F 3/0683 718/104 |
| 8,880,474 | B2 | 11/2014 | Mason et al. | |
| 8,990,886 | B2 | 3/2015 | Lim | |
| 9,197,522 | B1* | 11/2015 | Arakelian | H04L 67/16 |
| 9,411,671 | B1* | 8/2016 | Johnson | G06F 11/30 |
| 9,542,430 | B1 | 1/2017 | Fitterer et al. | |
| 9,547,656 | B2* | 1/2017 | Aleshire | G06F 16/13 |
| 9,720,799 | B1* | 8/2017 | Lachwani | G06F 11/3604 |
| 10,223,261 | B2* | 3/2019 | Baek | G06F 12/0802 |
| 10,248,915 | B2* | 4/2019 | Foley | G06Q 10/06 |
| 10,437,497 | B1* | 10/2019 | LeCrone | G06F 3/0607 |
| 2003/0020621 | A1* | 1/2003 | Kessler | H04L 63/164 340/635 |
| 2003/0110467 | A1* | 6/2003 | Balakrishnan | G06F 16/25 717/104 |
| 2005/0132330 | A1* | 6/2005 | Zempel | G06F 9/5027 717/120 |
| 2005/0216670 | A1* | 9/2005 | Atkinson | G06F 12/0875 711/118 |
| 2006/0107251 | A1* | 5/2006 | Boshier | G06F 8/71 717/108 |
| 2006/0282498 | A1* | 12/2006 | Muro | H04L 67/34 709/203 |
| 2007/0087745 | A1* | 4/2007 | Poyhonen | H04W 36/0066 455/432.1 |
| 2008/0134207 | A1* | 6/2008 | Chamieh | G06F 11/3419 719/315 |
| 2008/0172620 | A1* | 7/2008 | Yoshimura | G06F 16/958 715/760 |
| 2008/0243910 | A1* | 10/2008 | Meadows | G06F 40/14 |
| 2009/0044267 | A1* | 2/2009 | Dawkins | G06F 21/575 726/16 |
| 2010/0030752 | A1 | 2/2010 | Goldentouch | |
| 2010/0174692 | A1 | 7/2010 | Meyer et al. | |
| 2010/0287208 | A1* | 11/2010 | Mao | G06F 16/288 707/803 |
| 2010/0299665 | A1* | 11/2010 | Adams | G06F 9/45533 718/1 |
| 2010/0313189 | A1* | 12/2010 | Beretta | G06F 21/54 717/148 |
| 2011/0145482 | A1* | 6/2011 | Yu | G06F 21/6209 711/103 |
| 2012/0101991 | A1* | 4/2012 | Srivas | G06F 16/1844 707/623 |
| 2012/0254111 | A1* | 10/2012 | Carmichael | G06F 16/134 707/627 |
| 2012/0259613 | A1* | 10/2012 | Lafaye | G06F 11/3457 703/21 |
| 2013/0046792 | A1* | 2/2013 | De Magalhaes | G06F 16/9027 707/797 |
| 2014/0143786 | A1* | 5/2014 | Ripberger | G06F 3/0605 718/104 |
| 2014/0189125 | A1* | 7/2014 | Amies | G06F 9/45558 709/226 |
| 2014/0189426 | A1* | 7/2014 | Ben-Kiki | G06F 11/0793 714/15 |
| 2015/0066960 | A1* | 3/2015 | Beck | G06F 16/22 707/751 |
| 2015/0066998 | A1* | 3/2015 | Beck | G06F 16/22 707/812 |
| 2015/0095340 | A1* | 4/2015 | Bishop | G06F 16/907 707/741 |
| 2015/0220372 | A1* | 8/2015 | Ban | G06F 9/52 710/200 |
| 2015/0363468 | A1 | 12/2015 | Alvey et al. | |
| 2016/0291942 | A1* | 10/2016 | Hutchison | G06F 8/451 |
| 2016/0342808 | A1* | 11/2016 | Johnson | G06F 16/9024 |
| 2017/0091235 | A1* | 3/2017 | Yammine | G06F 16/1865 |
| 2017/0109214 | A1 | 4/2017 | Raman et al. | |
| 2017/0220531 | A1* | 8/2017 | Hamer | G06F 16/957 |
| 2018/0136959 | A1* | 5/2018 | Vyas | G06F 9/5055 |
| 2020/0201867 | A1* | 6/2020 | Lappas | G06F 9/44526 |

OTHER PUBLICATIONS

"Azure AD: Under the hood of our geo-redundant, highly available, distributed cloud directory," Alex Simons, Sep. 2, 2014, available at https://blogs.technet.microsoft.com/ad/2014/09/02/azure-ad-under-the-hood-of-our-geo-redundant-highly-available-distributed-cloud-directory/#, pp. 1-9.

U.S. Appl. No. 15/132,098, filed Apr. 28, 2016, Srikanth Mandadi, et al.

U.S. Appl. No. 15/475,031, filed Mar. 30, 2017, Alazel Acheson, et al.

* cited by examiner

EXECUTING CODE ASSOCIATED WITH OBJECTS IN A HIERARCHIAL DATA STRUCTURE

BACKGROUND

Hierarchical storage systems offer users a way to persist hierarchical data structures. Hierarchical data structures stored in such hierarchical storage systems may provide users with the ability to store and managed related data in way that reflects the relationships between the data. Such hierarchical structures may be used to implement many different services, including resource management systems, directory systems, payroll systems, and other systems that leverage data relationships to reason over the data stored therein. Techniques that optimize interactions with hierarchical storage systems, reducing user burden and providing greater management flexibility may be highly desirable.

Figure 1:
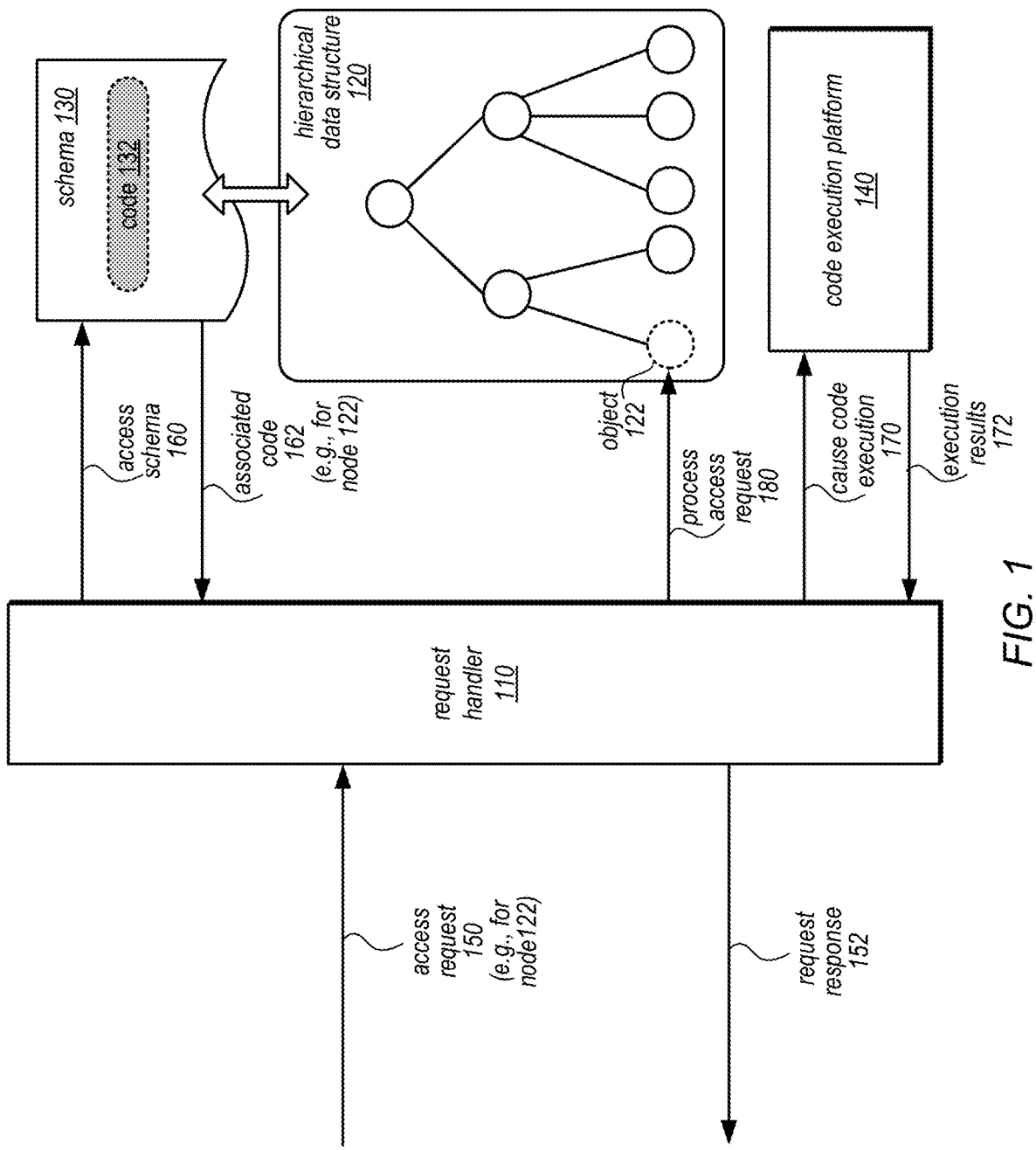
FIG. 1 is a logical block diagram illustrating executing code associated with objects in a hierarchical data structure, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f), interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of illustrating executing code associated with objects in a hierarchical data structure are described herein. A hierarchical data store, such as a directory data store, may allow users to programmatically manage data using client-side applications that perform various operations to validate access requests to objects in a hierarchical data structure, transform data of an object from one format to another, or generate data from data of objects in the hierarchical data structure. As the organization of data changes, or when additional clients begin utilizing the hierarchical data structure, new development may need to be performed in order to obtain the functionality of such operations. In some embodiments, code associated with objects in a hierarchical data structure may be maintained in a schema applicable to the hierarchical data structure so that the code may be executed to perform different operations when objects in the hierarchical data structure are accessed. In this way, clients of the hierarchical data store can rely upon code that is already maintained and executed by the hierarchical data store without incurring the burden of developing or adding to client-side applications to achieve the same functionality present in the code. For example, new clients of a hierarchical data structure can utilize existing code in the schema to perform various operations without having to separately implement those operations.

FIG. 1 is a logical block diagram illustrating executing code associated with objects in a hierarchical data structure, according to some embodiments. A hierarchical data structure, such as hierarchical data structure 120 may be stored as part of a hierarchical data store. A hierarchical data structure may include one or multiple objects organized according to one or multiple links that provide relationships, paths or other form of hierarchy between objects. In this way, the relationship of objects, and data values associated or stored as part of objects, can be modeled and maintained in the data structure. For example, an organization chart indicating the reporting structure between company managers and employees can be modeled in a hierarchical data structure that indicates the relationship between employees, and may include data specific to each employee (e.g., name, assignment, years of service, etc.).

In at least some embodiments, a schema, such as scheme 130, may be applied to a hierarchical data structure to further define the different relationships between objects. For example, each employee may be an instance of an employee class defined in a schema for the hierarchical data structure, some employees may also be instances of a manager class, and some employees may instances of an executive class. Each class may include attributes and other values which may be automatically allocated to (or defined for) an object that is the instance of that class. For example, the executive class may include an attribute for managed business units. When creating or updating an object of the executive class managed business unit values can be stored. A client application accessing the hierarchical data structure can understand from the schema that an executive object is expected to or can have values for managed business units.

Schema 130 may associate code 132 to be executed when an object, such as object 122 is accessed in the hierarchical data structure. For example, the code may be defined or referenced as an attribute of the executive class to validate whether an update to the managed business units attribute is an existing business unit (and therefore a valid business unit). As illustrated in FIG. 1, an access request 150 (e.g., for object 122), is provided to a request handler 110 for a hierarchical data store. Request handler 110 may access 160 schema 130 to identify associated code 162 for the accessed object (e.g., object 122). An access request may be, in various embodiments, a request to create, read, update, or delete an object of hierarchical data structure 120. Request handler 110 may then cause 170 code execution platform 140 to execute the identified code. For example, the code may be a script or other interpretable or compiled language which code execution platform 140 may parse, generate an executable, and then execute. Code 132 may be obtained directly from schema 130 or from a location or source identified by schema 130 (e.g., a remote store or location at the code execution platform itself—which may store the code for execution upon request by request handler 110).

The results 172 of code execution may be provided to request handler 110, which may process access request 180 based on the results 172. For example, the results may indicate that the example update to the business unit includes a non-existent business unit value, and may deny the request or only update to include existing business unit values. A response to the request 152 may indicate the success, failure, or other results for the access request. In some embodiments, the code may perform a transformation of a data value (e.g., change a string value for object 122 to an integer data format) retrieved from hierarchical data structure 120 or from another source and provide the transformed data as part of the request response 152. Code may be selectively performed, in some embodiments. For example, if access request 150 is a request to read a value from object 122 and code associated with object 122 is code that executes upon a request to modify object 122, then the associated code may not be performed.

Please note, FIG. 1 is provided as a logical illustration of a hierarchical data structure executing code associated with objects in the hierarchical data structure, and is not intended to be limiting as to the physical arrangement, size, or number of components, modules, or devices, implementing a request handler, schema, code execution platform, or hierarchical data structure.

The specification first describes an example of a distributed hierarchical data store as a network-based directory storage service, according to various embodiments. The example directory storage service may store hierarchical data structures for many different clients, in various embodiments. Included in the description of the example directory storage service are various aspects of the example directory storage service along with the various interactions between the directory storage service and clients. The specification then describes a flowchart of various embodiments of methods for executing code associated with objects in a hierarchical data structure. Next, the specification describes an example system that may implement the disclosed techniques. Various examples are provided throughout the specification.

Figure 2:
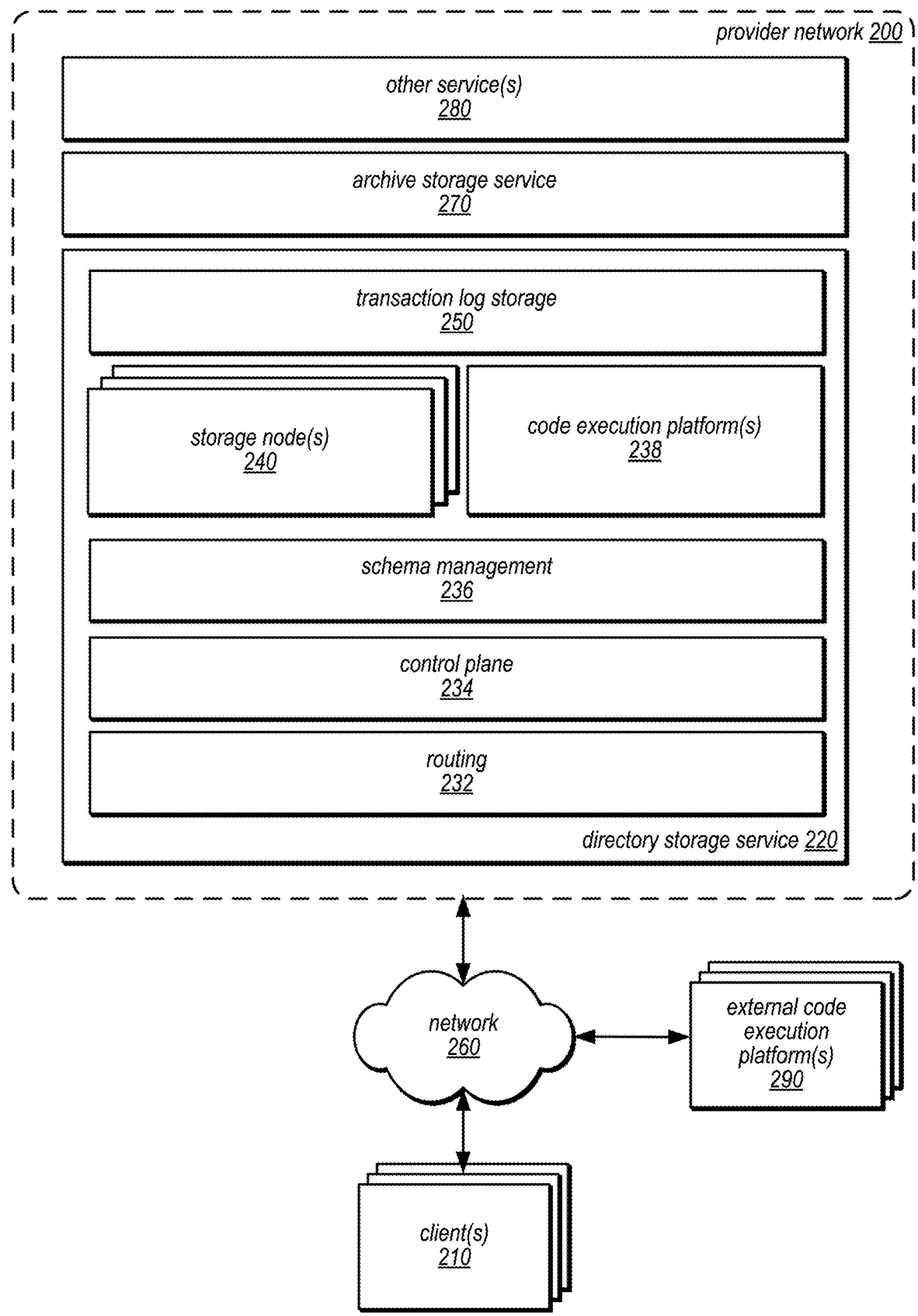
FIG. 2 is a logical block diagram illustrating a provider network that implements a directory storage service including a hierarchical data store that receives, associates, and executes code for objects in a hierarchical data structure, according to some embodiments.

FIG. 2 is a logical block diagram illustrating a provider network that implements a directory storage service including a hierarchical data store that receives, associates, and executes code for objects in a hierarchical data structure, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200. In some embodiments, provider network 200 may implement a directory storage service 220, described, provide other computing resources or services, such as a virtual compute service and storage services, such as object storage services, block-based storage services, data warehouse storage service, archive storage service 270 and/or any other type of network based services 280 (which may include various other types of storage, processing, analysis, communication, event handling, visualization, and security services, such as a code execution service that executes code without client management of the execution resources and environment). Clients 210 may access these various services offered by provider network 200 via network 260. Likewise network-based services may themselves communicate and/or make use of one another to provide different services. For example, various ones of other service(s) 280 may store, access, and/or rely upon hierarchical data structures stored in directory storage service 220 or may execute code associated with an object in a hierarchical data structure stored in directory storage service 220.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Directory storage service 220 may store, manage, and maintain hierarchical data structures, such as a directory structure discussed below with regard to FIG. 4, stored at various ones of storage node(s) 240 (in single tenant or multi-tenant fashion). Clients of directory storage service 220 may operate on any subset or portion of the hierarchical data structure with transactional semantics and/or may perform path-based traversals of hierarchical data structures. Such features allow clients to access hierarchical data structures in many ways. For instance, clients may utilize transactional access requests to perform multiple operations concurrently, affecting different portions (e.g., nodes) of the hierarchical directory structure (e.g., reading parts of the hierarchical directory structure, adding an object, and indexing some of the object's attributes, while imposing the requirement that the resulting updates of the operations within the transaction are isolated, consistent, atomic and durably stored).

In various embodiments, directory storage service 220 may implement routing layer 232 to direct access requests from internal or external clients to the appropriate storage node(s) 240. For example, routing layer 232 may implement a fleet of routing nodes that maintain mapping information which identifies the locations of a hierarchical data structures on storage node(s) 240. When an access request is received, routing layer nodes may then determine which one of the storage node(s) that hosts the hierarchical data structure identified in the access request to send the access request. Consider a scenario where hierarchical data structures may be replicated across multiple different storage nodes 240 as part of a replica group. Routing 232 may implement various load balancing schemes to direct requests from different clients to different hierarchy storage nodes within the replica group, so that no single storage node becomes overburdened. Moreover, as storage nodes 240 may utilize tokens to maintain state across different access requests sent by clients so that different hierarchy storage node(s) 240 may handle each request from the client, routing 232 need not track which storage node is communicating with which client.

Control plane 234 may implement various control functions to manage the storage node(s) 240 and other components of directory storage service 220 that provide storage of hierarchical data structures, such as directing creation and placement of new hierarchical data structures on storage node(s) 240, storage scaling, heat management, node repair and/or replacement. For example, various placement schemes may utilize techniques such as consistent hashing (e.g., based on hashing an identifier for individual hierarchical data structures) to identify storage node(s) to store versions of the hierarchical data structure, or randomly mapping hierarchical data structures to a number hierarchy storage node(s) 240 that form a replica set. To provide heat management, for example, control plane 234 may collect storage node(s) 240 metrics published by each node. Each host may have various thresholds for performance characteristics, such as memory utilization, CPU utilization, disk utilization, and request-rate capacity. When a hierarchy storage node reports metrics that exceed a threshold (or multiple thresholds), control plane 234 may direct the migration of one or more hierarchical data structures to different storage nodes. Similarly, control plane 234 may detect when certain storage nodes are unable to keep up with access requests directed to a particular replica group for a hierarchical data structure and may provision additional storage node(s) to horizontally scale the replica group to better meet the access request demand.

Figure 3:
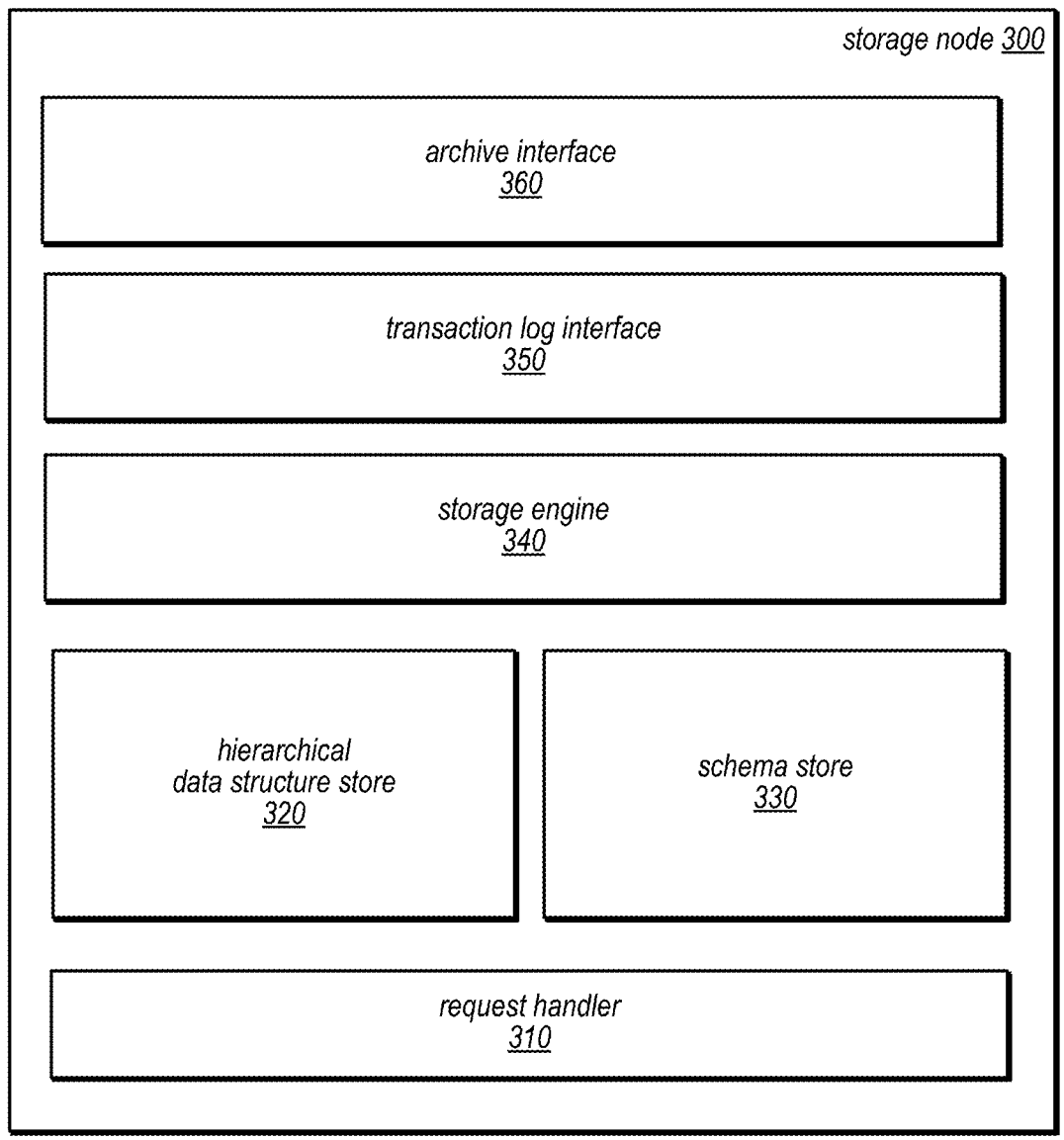
FIG. 3 is a logical block diagram illustrating a hierarchy storage node, according to some embodiments.

Storage node(s) 240 may maintain and handle access to hierarchical data structures stored in directory storage service 220. FIG. 3 is a block diagram illustrating a hierarchy storage node, according to some embodiments. Hierarchy storage node 300 may implement request handler 310 to process access requests and pass along appropriate instructions or requests to other components, such as storage engine 340, transaction log interface 350 or archive interface 360. For example, access request handler 310 may interpret various requests formatted according to a programmatic interface, such as an application programming interface (API). Access requests may include various, such as various access requests to create, update, attach, detach, delete and query objects in a hierarchical data structure, and access requests to define, populate, discover, and query a local index (which may be strongly consistent and maintained as part of or separately from the hierarchical data structure) on hierarchical data structure object attributes.

Figure 4:
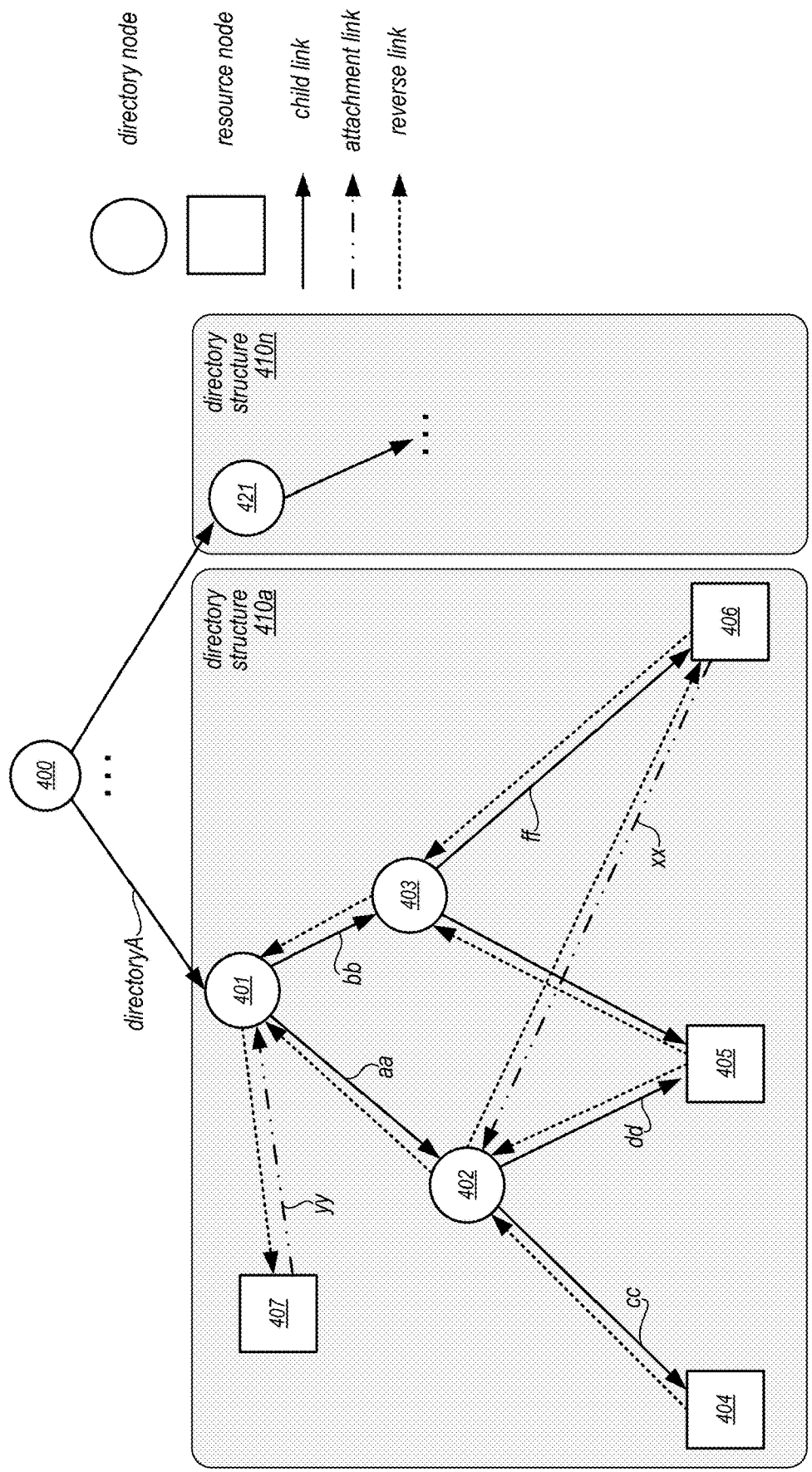
FIG. 4 is a logical block diagram illustrating a data model for a hierarchal data structure in a hierarchical data store, according to some embodiments.
Figure 5:
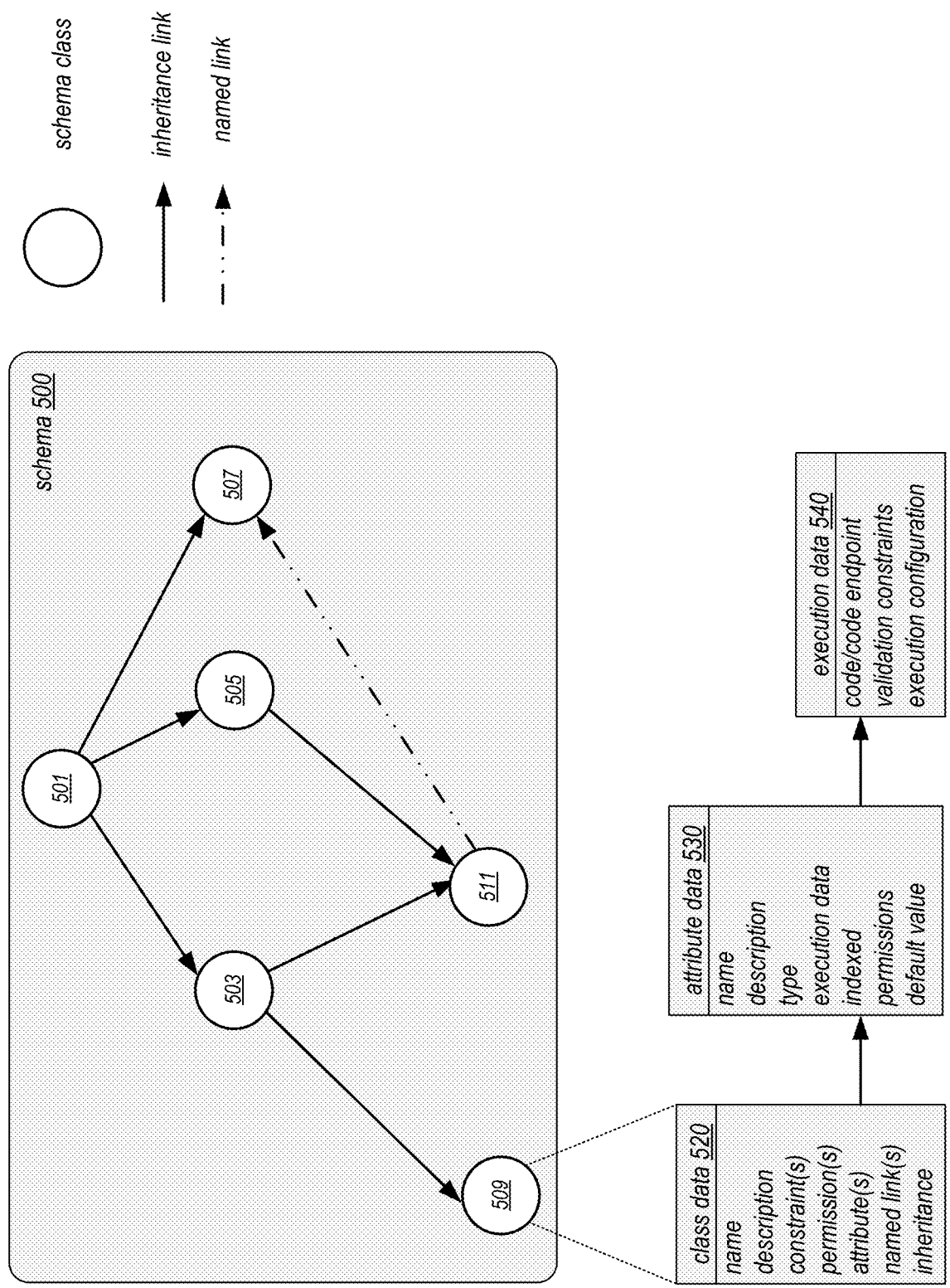
FIG. 5 is a logical block diagram illustrating a data model for a schema applicable to a hierarchal data structure in a hierarchical data store, according to some embodiments.

In various embodiments, storage engine 340 may be a storage engine configured to interact with the structure or format of data as it is stored in hierarchical data structure store 320 (e.g., a key-value storage engine for data maintained in key-value storage format, relational data storage engine for data maintained in a relational storage format, etc.) and schema store 330 which may maintain a schema that is applied to the hierarchical data structure maintained in hierarchical data structure store 320, which may be maintained according to the models discussed below with regard to FIGS. 4 and 5. In some embodiments, hierarchical data structure store 320 may be partially or completely stored or implemented in memory or other quick access storage devices, such as random access memory devices (RAM), as well as utilizing persistent block-based storage devices to store historical versions of hierarchical data structures, including magnetic disk or solid state drives. In some embodiments, caching techniques may be implemented so that frequently accessed portions of data, such as frequently access portions of hierarchical data structures are maintained in memory components whereas other portions are maintained in block-based persistent storage components. Storage node 300 may operate multi-tenant storage for hierarchical data structures so that different hierarchical data structures maintained on behalf of different clients, accounts, customers, and the like may be maintained in hierarchical data structure store 320 and schemas applied to the hierarchical data structures in schema store 330. For example, storage node 300 may participate in different replica groups with different storage nodes for the different hierarchical data structures stored at storage node 300.

Transaction log interface 350 may provide capabilities to interact with (e.g., validate transactions) with respect to the logs corresponding to hierarchical data structures stored in transaction log storage 250 for the hierarchical data structures, according to the various techniques. Transaction log storage 250 may provide consistent storage for hierarchical data structures, according to some embodiments. Multiple clients may perform various access requests to a hierarchical data structure concurrently, such as various write requests. In a least some embodiments, a replica group may include multiple storage nodes that maintain versions of the hierarchical data structure that are available for servicing various access requests from the multiple clients. For example, clients can submit different write requests to storage nodes according to a routing layer (e.g., routing layer 232) which may direct access requests from each client to a different storage node in the replica group according to a load balancing scheme. Upon receiving the request, each storage node may perform various operations upon a version of the hierarchical data structure at the storage node, then offer the writes to transaction log storage 210 for commitment to directory structure log stored in transaction log storage (including various information such as the affected or accessed data by performing the write request, the write request itself, and a transaction sequence number of other indication identifying the point-in-time of the current version of the hierarchical data structure at the storage node). Indications of commitment or conflict may be provided back from transaction log storage 250 to the respective storage nodes. For those writes that are committed, the directory structure log may be read and committed writes applied to the respective versions of the hierarchical data structure maintained at the multiple storage nodes.

Similarly, archive interface 360 may be implemented to retrieve archived transactions or snapshots to service an access request for historical changes to the hierarchical data structure, a historical query, or other access requests that require a version of the hierarchical data structure that is older than that maintained in hierarchical data structure store 320. In some embodiments, an archival management layer (not illustrated) may utilize transactions stored for different hierarchical data structures stored in respective transaction logs in transaction log storage 250 to generate and store snapshots of the hierarchical data structure at different points in time in archive storage service 270. For example, archival management may determine when snapshots of a hierarchical data structure should be captured, provision appropriate storage locations in archive storage service 270, and direct archive worker nodes (not illustrated) to perform the read, write, and other operations to generate and place the snapshots in archive storage service 270. Similarly, archival management may direct the copying and storage of individual log records/transactions and/or groups of log records and transactions to be stored as part of an archived transaction log for hierarchical data structures in archive storage service 270. Archival management may read the hierarchical data structure log to retrieve writes for transmission as archived transactions or snapshots of the hierarchical data structure maintained in archive storage service 270. Archival management may then periodically or aperiodically update an archived log in archive storage service 270 and generate and send new snapshots to be maintained as part of archived snapshots in archive storage service 270. In this way, the hierarchical data structure can be recreated at any point-in-time, for example by loading a snapshot onto a storage node and applying transactions from an archived log to reach a certain transaction sequence number so that the version of the hierarchical data structure at the storage number is consistent with a specified point-in-time.

Turning back to FIG. 2, transaction log storage 250 may provide a fault tolerant, high performance, durable, log publishing service. Transaction log storage 250 may be used as a commit log underlying strongly consistent distributed applications such as databases, key-value stores, and lock managers, and as illustrated in FIG. 2 directory storage service 220 providing hierarchical data storage, as discussed above. Transaction log storage 250 may provide strong consistency guarantees and support constraints between committed records, to enable features like deduplication, sequencing, and read-write conflict detection. For example transaction log storage 250 may determine whether or not to commit changes to hierarchical data structures (e.g., write requests and other modifications) by examining a proposed transaction for conflicts with other committed transactions. Such a feature may provide a fine-grained locking model over the hierarchical data structure (e.g., only those portions of the hierarchical data structure affected by a conflict between transactions may be locked). Transaction log storage 250 may maintain a separate log or chain of log records for each hierarchical data structure, serving as an authoritative definition of the changes to the state hierarchical data structure over time. Transactions may be ordered according to transaction sequence numbers, which may be monotonically increasing to reference the state of a hierarchical data structure at individual points in time. Note that in some embodiments, transaction log storage 250 may be a separate network-based storage service implemented as part of provider network 250 external to directory storage service 220.

Generally speaking, clients 210 may encompass any type of client configurable to submit network-based services requests to provider network 200 via network 260, including requests for directory services (e.g., a request to create or modify a hierarchical data structure to be stored in directory storage service 220, etc.). For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of persistent storage resources to store and/or access one or more hierarchical data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application configured to interact directly with network-based services platform 200. In some embodiments, client 210 may be configured to generate network-based services requests according to a Representational State Transfer (REST)-style network-based services architecture, a document-based or a message-based network-based services architecture, or another suitable network-based services architecture.

In some embodiments, a client 210 may be configured to provide access to network-based services to other applications in a manner that is transparent to those applications. For example, client 210 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to hierarchical data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Different types of hierarchical data structures may be stored, managed, and or represented in different ways. FIG. 4 is a block diagram illustrating one example of a data model for a hierarchal data store that provides hierarchical data structures, according to some embodiments. A directory, for example may be a hierarchical data structure, such as directory structures 410a or 410n, and may be represented with circles or squares in the graph depicted of FIG. 4 (e.g., objects 400, 401, 402, 403, 404, 405, 406, 407, and 421). An object may have a globally unique identifier (GUID), zero or more attributes (key, value pairs), and zero or more links to other objects. In some embodiments, a directory may be one type of object which has zero or more child links to other objects, either directories or resources. Directory objects may have zero or one parent directory object, implying that directory objects and inks define a tree structure, in some embodiments. In FIG. 4, object 401 is an example of a directory object. Object 400 may be a root object that is the logical root multiple directory structures 410 and may not be visible to clients of directory storage service 220, in some embodiments. Resource objects (represented by squares such as resource objects 404, 405, 406, and 407) may be leaf objects in a directory structure 410. A resource object may have a unique external Id (e.g., client specified) and client-defined attributes. Resource objects can have more than one parent object (which would allow for some hierarchical data structures to be configured as a Directed Acyclic Graph (DAG). Object 405 in FIG. 4 is an example of a resource object and it has two parents (objects 402 and 403).

In some embodiments, multiple types of resource objects may be implemented. For example, in some embodiments, policy objects may be a type of resource object with two user-defined attributes: a policy type and policy document (e.g., describing a policy applied to applicable objects). For example, resource object 406 in FIG. 4 may be an example of a policy resource object. Another type of resource object may be an index resource object. For example, an index resource object may be an index on various attributes values of objects in the child objects and other descendant objects of the directory object to which the index object is attached. For example, if resource object 407 is an index object, then index object 407 may provide an index object for the attributes of child objects 402 and 403 as well as descendant objects 404, 405, and 406.

In some embodiments, a link may be a directed edge between two objects defining a relationship between the two objects. There may be many types of links, such as client visible link types and another link type for internal operation implementation. In some embodiments, a child link type may create a parent—child relationship between the objects it connects. For example, child link 'bb' connects object 401 and object 403. Child links may define the hierarchies of directory structures 410. Child links may be named in order to define the path of the object that the link points to. Another type of client visible link may be an attachment link. An attachment link may apply a resource object, such as a policy resource object or index resource object, to another resource object or directory object. Attachment links may not define the hierarchical structures of directory structures 410. For example, attachment link 'xx' applies the policy attribute stored in policy resource object 406 to directory object 402. Objects can have multiple attachments. In some embodiments, some attachment restrictions may be enforced, such as a restriction that not more than one policy resource object of any given policy type can be attached to a same object. A non-client visible type of link or implied link type may also be implemented in some embodiments, a reverse link. Reverse links may be used for optimizing traversal of directory structures 410 for common operations like resource object look-ups (e.g., policy lookups). Directory storage service 220 may maintain reverse links in the opposite direction of child and attachment links.

In various embodiments, objects in directory structures 410 can be identified and found by the pathnames that describe how to reach the object starting from the logical root object 400, starting with the link labeled "l" and following the child links separated by path separator "l" until reaching the desired object. For example, object 405 can be identified using the path: "/directoryA/aa/dd". As some objects may be children of multiple directory objects, multiple paths may identify an object. For example, the following path can also be used to identify object 405: "/directoryA/bb/ee". As directory structures 410 may be a collection of objects whose boundary is defined by the hierarchy of those objects in the collection (e.g., the resulting hierarchical data structure, such as the tree or DAG created by the links between objects). In this way, directory structures 410 may represent separate, independent, or partially independent, organizations.

To store the illustrated directory structures in hierarchical data structure store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as tuples (Subject, Predicate, Object). When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 250 and may be assigned an ordered logical timestamp by transaction log storage 250.

As noted above in FIG. 3, storage nodes may maintain a current version of a hierarchical data structure and past versions of a hierarchical data structure. In at least some embodiments, different respective tables may be maintained for each hierarchical data structure, one table that stores the data for the current version and another table that stores immutable records for the previous versions. In various embodiments a current version table or previous versions table may be accessed to perform various operations for a hierarchical data structure. For example an access request may specify a query: "Find all children for Object whose ID is GUID_401 select GUID_401.child.* from CurrentVersion" or a query: "Find all policies for a resource object who's ID is GUID_405 along all paths to the root. To service such queries, a depth first traversal may be executed along the parent links. At each object along the path to the root, the following internal queries may be executed: internal query 1: "Find if the object has policies: select GUID_405.link.HasPolicy.* from CurrentVersion;" internal query 2: "If the object has policies returned in internal query 1, use the value from the link to get the policy document value from the policy object: select GUID_406.link.PolicyDoc from CurrentVersion," internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to hierarchical data structures.

In at least some embodiments, a schema may be applied to a hierarchical data structure, such as a directory illustrated in FIG. 4 or a sub-directory (e.g., a sub-set of objects within a directory). FIG. 5 is a logical block diagram illustrating a data model for a schema applicable to a hierarchal data structure in a hierarchical data store, according to some embodiments. Schema 500 may include one or multiple schema classes, which may be organized according to inheritance (e.g., parent and child) links and named links. For example, schema 500 in FIG. 5 illustrates six classes, 501, 503, 505, 507, 509 and 511, which may be arranged according to inheritance links and named links. A schema class may represent a set of attributes that can be attached to an object, in some embodiments. Each individual directory object may have any number of classes associated with it, and each class applied to the object may maintain its own independent set of attributes. Each schema class may consist of fundamental metadata, as illustrated at 520. The set of schema classes, their constraints, and the relationships between them may constitute a schema, such as schema 500.

A schema may be treated as a set of metadata which can be referred to from a variety of different locations (e.g., from different directory structures). For example, a directory structure references a schema, that directory structure has "applied" the referenced schema. In at least some embodiments, all data within a directory structure that applies a schema must conform to that schema. A schema can be applied to multiple directories, serving as a blue-print for constructing and maintaining the different directories. Once a schema is applied to a directory structure, it may be extended or modified from the originally referenced form of the schema, as discussed below in some embodiments. A schema may itself be modified so that each directory that applies the schema can apply the modified version of the schema (if desired), in some embodiments. Schema contents (e.g., classes, links, etc.) may be consumed by programmatically by clients accessing the directory (e.g., via API calls). By exploring the schema, clients can discover the full set of classes, including attributes and constraints of the classes, which apply to data within the directory.

Inheritance links may define a parent or child schema class for a schema class. In some embodiments, a schema class may reference one or more parent schema classes. Attributes may not be inherited from parent schema classes, in some embodiments. However, when an object is created or associated with a schema class, the object may become an instance of ancestor schema classes as well, in some embodiments. For example, if a "Manager" class has an "Employee" class as a parent, and an "Employee" class has a "Person" class as a parent, assigning a new object to the "Manager" class may automatically assign the "Employee" and "Person" to the object. This may allow for the effect of inheriting the attributes of the classes, but without those attributes crossing into the derived class's attribute set, in some embodiments. Attribute sets for each class may be permanently distinct. Inheritance links may be defined at schema class creation time, and may be immutable, in some embodiments. In this way, concrete assumptions about the presence and absence of attributes for an object can be made, which facilitates modeling object hierarchies, in various embodiments. Immutable class inheritance may also avoid scenarios where a parent class's attributes are either absent (in the case of a parent class added after the object was created) or stranded (in the case of a parent class removed after the object was created). In other embodiments, however, a schema classes may inherit attributes directly from parent schema classes.

Named links may allow one object of a class to hold a reference to another object of another class within the hierarchical data structure without affecting policy inheritance, or implying organizational ownership between objects. Named links, in some embodiments, may represent relationships, acting as an attribute which refers to another object. An example is the relationship between an object of class "employee" and an object of class "laptop" assigned to the employee. The laptop may exist independently of the employee, and may have alternate parentage within the hierarchical data structure which defines permissions, cost centers, or other characteristics which may not be affected by its relationship to the employee assigned to it. The relationship may be navigable due to the named links from either side, but does not affect the application of policy to either item. In some embodiments, named links occupy the same namespace as normal attributes defined in a class, that is, names of attributes and named links may not be the same. A named link attribute may specify a target class. The referenced object may be an instance of the targeted class (or a sub-class thereof). One form of a named link may be a one-to-many mapping (e.g., "user"). Setting the 'user' named link may override any previous setting for that link, essentially moving the attachment from the previously referenced object to the new object. In one embodiment, many-to-many mappings implemented as named link(s) may allow users to specify numerous relations of a specific type, e.g., for device ownership. Such mappings may act as a labelled set of children. Named links may be independent of attachment between objects. Named links may connect any two objects regardless of type. Policy lookup may not consider named links. Constraints on attachments made to objects may not apply to named links. For example, if an object of class 'Employee' can only have other 'Employee' objects as children, defining a named link that links the 'Employee' to the 'device' may additionally allow device objects to be attached to an 'Employee' that are not 'Employee' objects.

A class may be described by a set of class data, such that each object that is an instance of the class may include that data. For example, class data 520 may include a name, description (e.g., for developers, administrators, or consumers), constraints (e.g., an object that is an instance of this class 'must be child of an object that is an instance of class X', 'child objects must be instances of class Y'), permission(s) (access controls for the object), attribute(s) (see attributed data 530 below), named link(s) (as discussed above), and inheritance (e.g., parent or child classes), in some embodiments. One or multiple attributes may be included in a class, and may include various data such as attribute data 530. In this way, a class can describe what data is stored as part of an object and how that data may be interacted with by a client. For example, permissions assigned to a schema class (or attribute or schema) may be considered when requests are made against a schema (to read or apply it), or against an applied schema (to read or write directory data). Permissions may be defined on the schema class, but influence all read operations related to objects that are instances of that class. Consider a scenario where a client attempts to read a set of attribute fields on an object. The object may be an instance of a schema class and the schema class's permissions may be included in the authorization of that request. In this way, a schema class's permissions may state a specific set of clients (users or other entity associated with an identity) is allowed to read a specific list of attributes on any instances of that schema class. Similar permissions could be enforced with respect to other operations for objects that are instances of that schema class, including creation and deletion operations. Note that, in some embodiments, permissions may only apply to the set of attributes for a specific schema class, and not for the directory object itself, which is an instance of the schema class. For instance, a client could be able to read and modify one set of attributes of an object that is an instance of one schema class, and be unable to read another set of attributes on the same object according to different permissions for the other set of attributes of a different schema class (which the object is also an instance of).

Attribute data 530 may include attribute name, description, type (e.g., string, int, code, code pointer, etc.), execution data (see execution data 540), indexed (e.g., a type of data that is indexed in the hierarchical data structure index), permissions (e.g., who can read/write the attribute data value), and default value (e.g., which may be provided if not overwritten for a particular instance of the class). Different attribute data types may include, but are not limited to, String, Integer, Boolean, Decimal, and Date, to facilitate sorting or selecting objects based on inequality comparators (e.g., querying for a bounded or unbounded interval in a range). In some embodiments, attributes may be defined as "shared". Shared attributes may participate in a directory-global namespace which may be managed by schema management 236 in FIG. 2. When two schema classes define shared attributes with the same name, the values of those shared attributes may be shared across the schema classes. For example, if a "User" schema class is defined with a shared "surname" attribute, and an "Employee" schema class attribute is also defined with a shared "surname" attribute, an update of one attribute will also update the other. In some embodiments, only one value of a shared attributed may be stored. In order to update a shared attribute, a new value may have to be validated for all attribute definitions of the different class schemas that share the attribute and apply to the object, in some embodiments. Attribute constraints may be automatically validated or validated/interacted with as part of execution data of client-specified code, in some embodiments. Constraints may include min/max values, min/max lengths (e.g., for strings), acceptable character sets, or regular expression-based validation.

In some embodiments, an attribute may be code or a pointer to code that is triggered for execution when an object that is an instance of the class that includes the attribute is accessed (e.g., for create, read, update, or delete). Execution data 540 may provide information for executing the code, such as the code to execute, or an endpoint, location, invocation, or other pointer to the code to execute, validation constraints (e.g., min and/or max values, length, possible values, etc.), and execution configuration information (e.g., timeout, error handling, result destination, execution platform type, execution criteria for determining whether or not to execute the code, etc.). In some embodiments, the code may be identified by a name, identifier, or other call that specifies one of a directory storage service provided set of functions for execution.

A schema may be stored in various ways. In some embodiments, a schema may be stored as a document (e.g., a JSON document) in a standard, hierarchical structure or in another language independent data format. The document may contain all shape-related information for the schema, including attribute type, validation rules, indices, and other auxiliary information. Indices and information which loses context when moved between accounts (e.g., permissions, references to external resources like external code execution platforms, etc.), may be represented separately in a manner which makes them easily distinguishable from the core schema shape information (e.g., in a separate JSON document). Permissions for a schema may be stored outside of the document, in some embodiments. For example, schema classes may be represented as children of a "schema class" node attached to the root node, forming the structural schema class hierarchy. Permissions may then be associated with each of the schema classes, in some embodiments, which can then be evaluated similar to perform a directory structure lookup operation as discussed above. Additional, clients can register for directory update event notifications without requiring mutation of the schema definition, in some embodiments.

Figure 6:
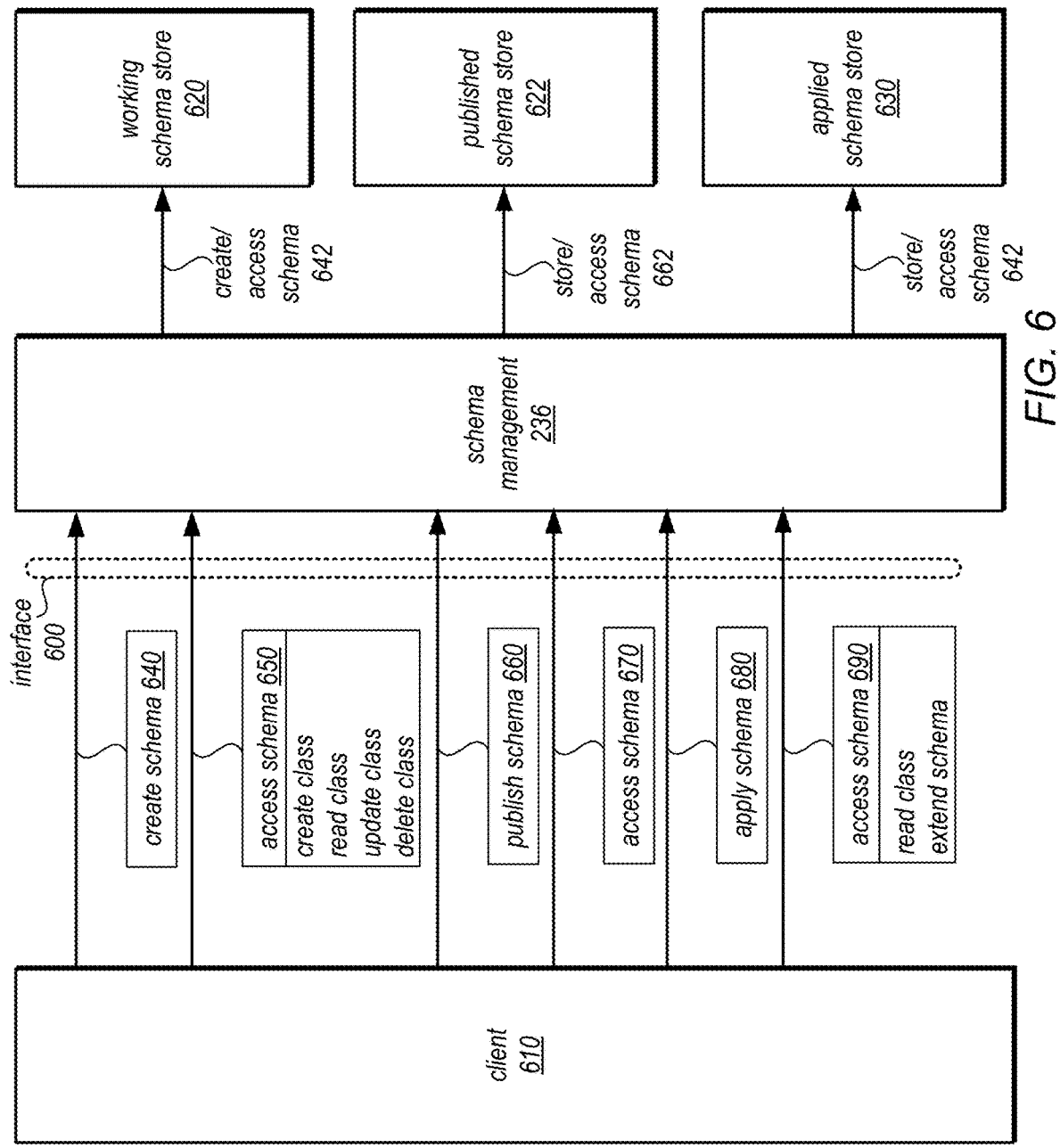
FIG. 6 is a logical block diagram illustrating interactions to manage a schema applicable to a hierarchical data structure, according to some embodiments.

FIG. 6 is a logical block diagram illustrating interactions to manage a schema applicable to a hierarchical data structure, according to some embodiments. A schema may be maintained in different states. In some embodiments, schema states may include a schema in a working state, published state, or applied state. Different versions of the schemas in working, published, or applied states may also be maintained. In some embodiments, the interactions with a schema may change dependent on the state of the schema being interacted with. For example, client 610 may send a request 640 to create a schema via interface 600 (e.g., via a graphical user interface (GUI), command line interface (CLI), and/or a programmatic interface (e.g., an API)). Schema management 236 may create 642 or allocate space for the schema in working schema store 620 (which may be stored on one more storage nodes 240 or another data store). In the working state, client 610 may submit access requests to schema 650 which may include requests to create a class, read a class, update a class, or delete a class. Such access requests may be performed 642 by schema management 236 with respect to the schema in working schema store 620. For example, attribute values for schemas (including code, pointers to code, or execution data 540 as discussed above in FIG. 5) may be added or changed, as part of an access schema request 650.

Client 610 may submit a request to publish a schema 660 in working state. For example, the request may include an identifier for the schema, as well as a publication destination or access controls for the published schema. In some embodiments, schema management 236 may move or otherwise store 662 the schema in a published schema store 622 (which may be separate from working schema store 620 or located in a different part of the same data store as working schema store 620). Once published, the access operations available to client 610 may change. A published schema, for example, may not be altered or modified. As illustrated in FIG. 6, client 610 may access schema 670 and may include operations such as a request to read a class from the schema, which schema management 236 may perform by accessing the schema 662.

Client 610 may submit a request to apply a schema 680 to a hierarchical data structure (e.g., such as a directory or sub-directory illustrated in FIG. 4). The request 680 may identify the hierarchical data structure (e.g., by identifier, name, or location). Schema management 236 may store a copy of the published schema 642 to the applied schema store 630 for the hierarchical data structure (e.g., which may be included in or co-located with a data store that stores the hierarchical data structure, such as on the same storage node(s) that store a copy of the hierarchical data structure). Client 610 may also submit requests to access the schema 690, which may read classes in the applied schema or request modifications to the schema that extend the schema. For example, additional classes may be added, inheritance links added, or named links added, in some embodiments. Modifications that remove or alter classes may be added, in some embodiments, after the modifications are confirmed to not conflict with the published schema that is the source of the applied schema.

Figure 7:
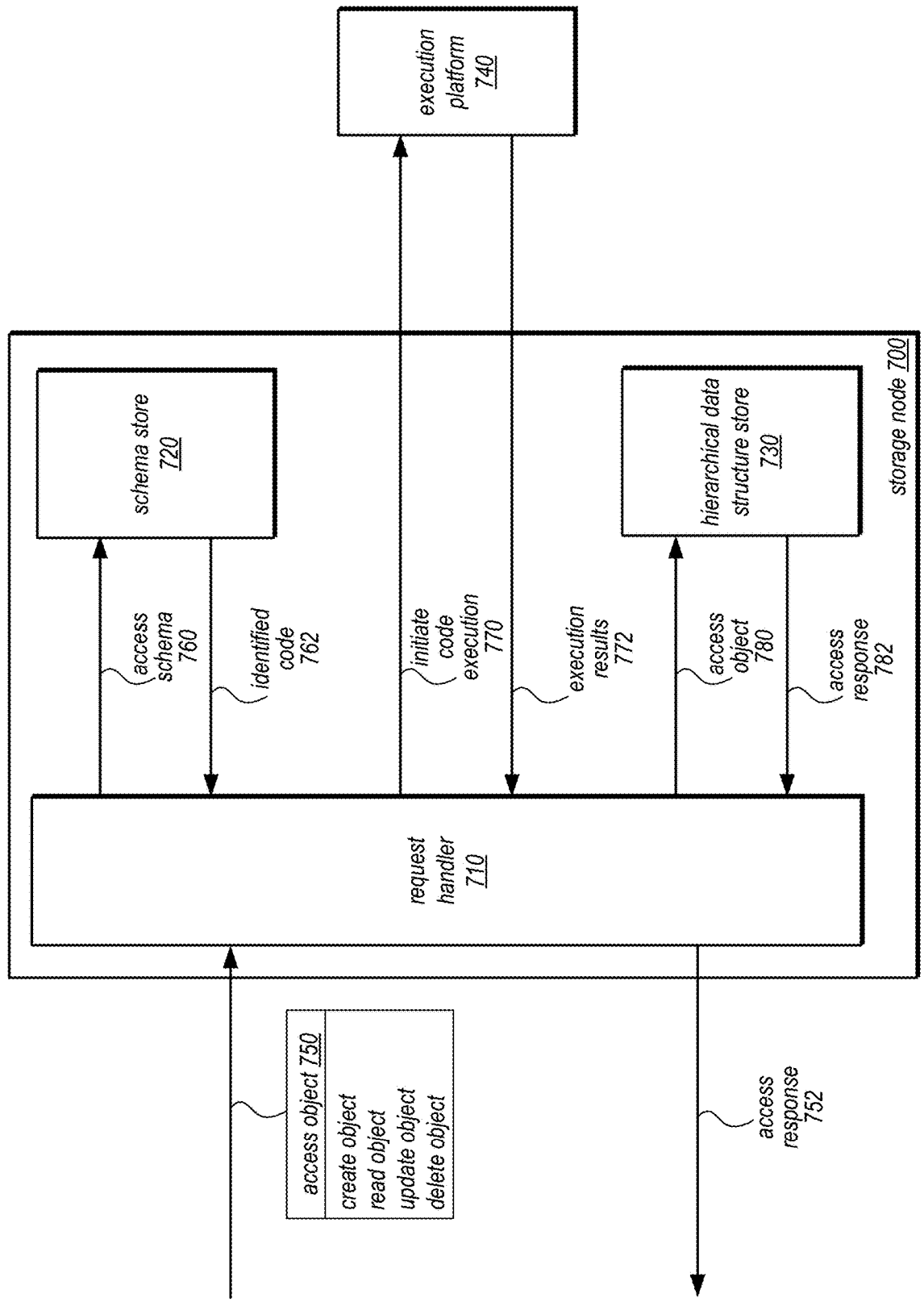
FIG. 7 is a logical block diagram illustrating interactions to access an object in a hierarchical data structure that is associated with code, according to some embodiments.

FIG. 7 is a logical block diagram illustrating interactions to access an object in a hierarchical data structure that is associated with code, according to some embodiments. Storage node 700 may be storage node like storage nodes 240 or 300 discussed above with regard to FIG. 3. Storage node 700 may implement request handler 710, like request handler 310, to handle a request to access an object 750 (e.g., dispatched to storage node by routing layer 232 in FIG. 2). Access object request 750 may identify the hierarchical data structure (e.g., by including a name or identifier), the object (e.g., by including a name, identifier, or location, such as a file path), and/or information indicating or describing the type of access request (e.g., requests to create an object, read an object, update an object, or delete an object), input parameters or other data to perform the access request (e.g., data values for the object), and/or access credentials to access the hierarchical data structure or object.

Request handler 710 may receive the access request 750. Request handler 710 may parse the access request to identify hierarchical data structure for the object and request the schema 760 for the hierarchical data structure from the hierarchical data structure store 730. For example, request handler 710 may access the root object in the hierarchical data structure in hierarchical data structure store 730 to obtain a pointer to the schema applied to the hierarchical data structure. An identifier of the schema 762 may be retrieved from hierarchical data structure store 730. Request handler 710 may then access the schema 764 in schema store 720 to determine what class(es) of the schema apply to the object. A pointer to the code (or the code itself) may be included in the schema, in some embodiments, so that when the class(es) of the object are determined, code 766 identified by those class(es) is obtained. In some embodiments, a determination may be made as to whether the code associated the object of access request 750 is applicable to the type of access request. For example, along with the code, execution criteria may be stored that identify the type of access request (e.g., create, read, update, or delete for which the access request is performed). Other execution criteria, such as the timing of when the code is executed (e.g., before or after performing the access of the object 780).

Request handler 710 may then initiate 770 or otherwise cause execution of the code at execution platform 740. As noted above in FIG. 2, execution platform 740 may be an internal code execution service or layer within directory storage service 210, such as code execution platform(s) 238 in FIG. 2, another system or service 280 within provider network 200 (e.g., a function execution service that executes code in response to an execution request directed to a network endpoint), or an execution platform or resource implement as part of an external system or service (e.g., on premise execution resources for a client). The initiation request may include any parameters, data values, and/or configuration information to execute the code. In some embodiments, a result destination (e.g., in addition to or instead of request handler 710) may be identified as part of the initiation request. Execution platform 740 may execute the code to perform one or more operations (e.g., validation operations, data transformations, data generation, analytics or reporting operations, etc.). Execution results 772 may be provided to request handler 710.

Request handler 710 may then access 780 the object in hierarchical data structure store 730 to perform the request access, dependent on the execution results. If, for instance, the result of a validation operation indicates that the access request is invalid, then the object may not be accessed and a failure indication returned as part of access response 752. If the execution results include transformed or generated data, then the data may be stored or returned (e.g., in place of data in the object) as part of servicing the access request. A response 782 to the access request (e.g., success, data values, etc.) may be returned to request handler 710, which in turn may generate a response 752 for access request 750 (e.g., indicating success, failure, requested data, etc.), in some embodiments.

Figure 8:
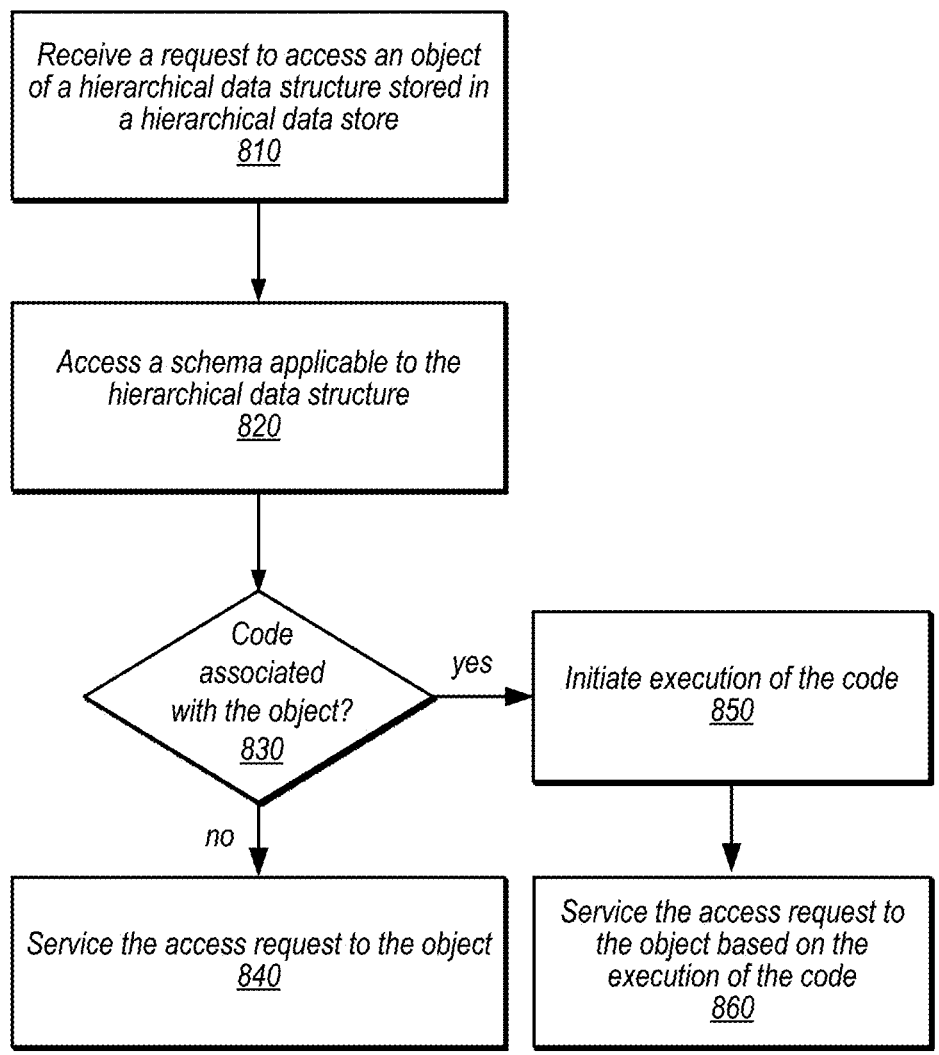
FIG. 8 is a high-level flowchart illustrating methods and techniques to execute code associated with an object in a hierarchical data structure, according to some embodiments.

The directory storage service, access requests, and other techniques discussed in FIGS. 2 through 7 provide examples of a distributed hierarchical data store storing a hierarchical data structure for a client and executing code included in a schema applicable to a hierarchical data structure in different scenarios. However, various other types of hierarchical storage systems may execute code associated with objects in a hierarchical data structure, which may utilize other numbers of types of components, which may provide distributed data storage. FIG. 8 is a high-level flowchart illustrating methods and techniques to execute code associated with an object in a hierarchical data structure, according to some embodiments. Various different distributed data stores including the embodiments described above may implement the techniques described below.

As indicated at 810, a request may be received to access an object of a hierarchical data structure stored in a hierarchical data store, in various embodiments. The request may be received according to an interface, including a graphical user interface (GUI), command line interface (CLI), and/or a programmatic interface (e.g., an API), in one embodiment. The request may specify the hierarchical data structure (e.g., by name, identifier, or location). Similarly, the request may specify the object (e.g., by name, location, or identifier for an existing or to be created object). As discussed above, with regard to FIG. 7, different types of access requests can be received. For example, in some embodiments, an access request to create the object, read the object, update the object, or delete the object may be received.

As indicated at 820, a schema applicable to the hierarchical data structure may be accessed, in some embodiments. For example, a pointer, link, identifier, or other association mapping a schema to the hierarchical data structure may be maintained as part of the hierarchical data structure so that when the hierarchical data structure is accessed, the schema applied to the hierarchical data structure is identified. The hierarchical data structure may be stored in a different format than the schema, in some embodiments. For instance, the schema may be stored according to human-readable text format (e.g., Javascript Object Notation (JSON)), instead of in a hierarchical structure. The schema may be parsed, scanned, or otherwise consumed to determine whether any code is to be executed when access the object. For example, an inheritance determination may be performed to determine the class(es) of which the object is an instance, according to inheritance information for each class included in the schema. The schema may identify code to be executed for the schema by including the code (e.g., as an attribute of the class) or a pointer to the code (e.g., a network endpoint, API call, or other invocation for initiating execution of the code), in some embodiments.

If code is associated with the object, as indicated by the positive exit from 830, then execution of the code may be initiated, as indicated at 850. For example, the code may be retrieved from a code repository (or from within the schema itself), and sent to an execution platform capable of consuming the code. In some embodiments, different execution platforms can consume different types of code, so a selection of the execution platform may be performed based on the code. Interpreted code, for instance, may be sent to an execution platform with an appropriate interpreter, in one embodiment, and code to be compiled, may be sent to an execution platform with a compiler that can compile the code. In some embodiments, a pointer to the code may be used to send a request or otherwise cause execution of code that is already present or stored at an execution platform. For example, a code execution service may store the code and execute the code in response to API request to execute the code, in one embodiment. Initiating execution of the code may include providing, sending, or determining parameters for the execution of the code. If, for instance, the code performs a validation operation, then validation requirements and data to be validated may be included in a request to execute the code.

In some embodiments, not illustrated in FIG. 8, a determination may be made as to whether code found to be associated with an object (as determined at 830) should be executed for the received access request. For example, execution, permission, or other performance criteria may be maintained for the code indicating conditions or requirements for execution, in one embodiment. Execution criteria may, for instance, specify the identity of a particular user, client, system, or source of the access request as associated with executing the code so that access requests from other users, clients, systems, or sources do not trigger execution of the code. In another example, the execution criteria may evaluate the access request with respect to other access requests or utilization of the hierarchical data, such as the volume or rate of access requests for the object or the hierarchical data structure. If, the access request would cause a rate of access requests to exceed a rate threshold for code execution, then execution of the code may not be performed. Different combinations of one or more execution criteria can be implemented for code, in various embodiments, and may be specified a client or other user when the code is submitted or otherwise associated with the object (e.g., when schema classes are created or modified, as discussed above with regard to FIG. 6).

As discussed above with regard to FIGS. 5-7, code may be executed to perform many different operations. Validation operations, for instance, may be performed to validate the data or an action taken when accessing the object. An access request to delete an object may, for instance, trigger execution of code that validates whether the object can be deleted (e.g., by checking dependencies on the object). Operations to generate a value in response to the access request may be performed, in some embodiments. For example, a default value for an attribute defined in the schema can be located and returned, if the object's attribute value is null. In another example embodiment, an operation may transform a data type of an attribute value, such as from an integer data type to a long integer data type, or from a data value recorded in degrees Fahrenheit to a data value in degrees Celsius. The operation may direct that the transformed data value be persistently stored, in one embodiment, or direct that the transformed data value not be persistently stored, in another embodiment.

The access request to the object may then be serviced based, at least in part, on the execution of the code, as indicated at 860. For example, if the operation is a validation operation, then the access request may be performed or denied dependent on whether the validation operation returns a valid or invalid result. In another example, if the operation transforms a data value, then the transformed data value may be returned or stored as part of servicing the access request. As indicated by the negative exit from 830, the access request to the object may be serviced, as indicated at 840, without any dependency or information from an execution result if node code is associated with the object.

Figure 9:
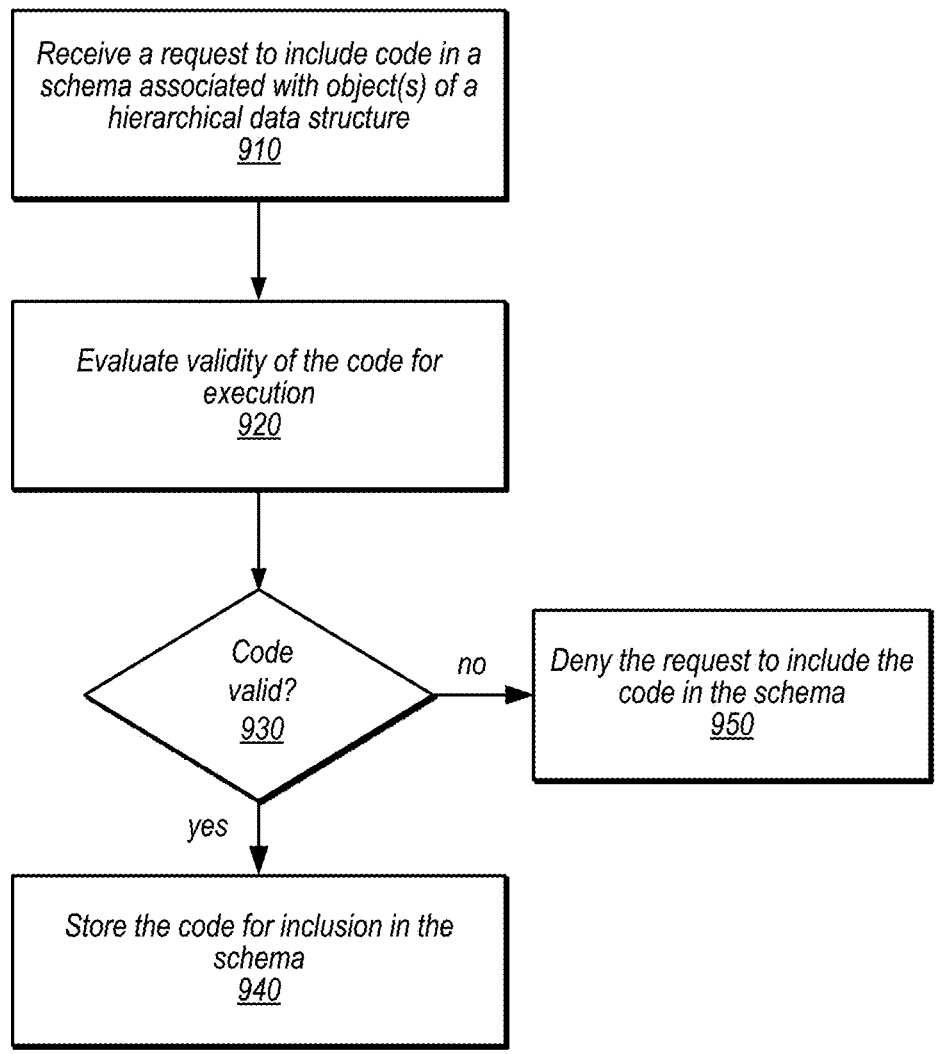
FIG. 9 is a high-level flowchart illustrating methods and techniques to include code in a schema applicable to a hierarchical data structure, according to some embodiments.

FIG. 9 is a high-level flowchart illustrating methods and techniques to include code in a schema applicable to a hierarchical data structure, according to some embodiments. As indicated at 910, a request to include code in a schema associated with object(s) of a hierarchical data structure may be received, in various embodiments. For example, the request may be received via an interface, including a graphical user interface (GUI), command line interface (CLI), and/or a programmatic interface (e.g., an API), in one embodiment. In some embodiments, the code may be included as part of the request, or may be uploaded or transmitted as part of a subsequent transmission. For example, a GUI may include a user interface element allowing a user to manually enter code into a text editing space before submitting the code in the text editing space to be included in the schema. In other embodiments, a pointer to the code may be included in the request. For example, a network endpoint or address, a function, procedure, or other identifier for the code may be included, as well as access credentials to execute the code at the network endpoint or address. The request may identify which portion of the schema to include the code and/or specify which objects or types of objects and/or execution criteria would invoke execution of the request. For example, the request may be a request to create a new class in a schema and may include the code as part of an attribute of the schema. In this way, when objects in the hierarchical data structure are identified as objects of the created class, then the code in the attribute of the class may be associated with the objects.

As indicated at 920, validity of the code for execution may be evaluated, in some embodiments. For example, the code may be parsed, scanned, or otherwise reviewed for unsafe or suspect operations (e.g., operations that directly access or modify memory without referring to a known object or address in the memory). In some embodiments, the code may be compiled or transformed to examine the code for signatures indicating malicious behavior. Classification or simulation techniques may be implemented, in some embodiments to predict or determine whether code exhibits malicious, and thus invalid, behavior.

As indicated by the negative exit from 930, the request to include code that it is determined to be invalid may be denied, as indicated at 950. For example, a response indicating request failure may be sent. In at least some embodiments, the response may include or indicate validation errors (to help identify corrections that could be performed to make the code valid). As indicated by the positive exit from 930, code that is determined to be valid may be stored for inclusion in the schema. In some embodiments, the code itself may be stored in a separate code repository identified by the schema or may be stored directly in the schema data store. While the code may be determined to be valid, in some embodiments an isolation level may be determined for the code and stored along with the code. When the code is executed, the code may be executed in accordance with the determined isolation level (e.g., safe for multi-tenant execution execute using sandbox isolation).

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may be configured to implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 10:
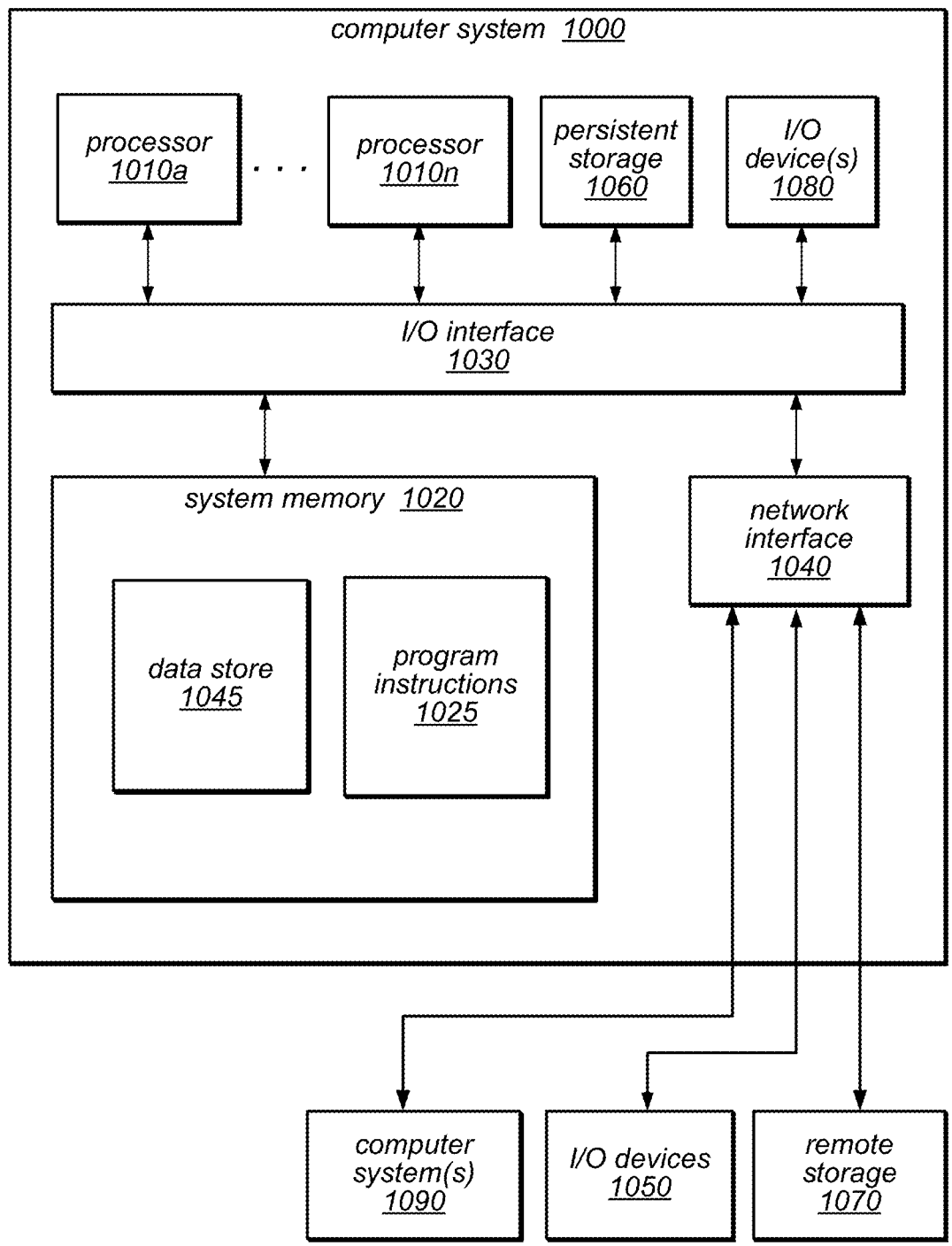
FIG. 10 is an example computer system, according to various embodiments.

FIG. 10 is a block diagram illustrating a computer system configured to implement executing code associated with objects in a hierarchical data structure, according to various embodiments, as well as various other systems, components, services or devices described above. For example, computer system 1000 may be configured to implement hierarchy storage nodes that maintain hierarchical data structures or components of a transaction log store that maintain transaction logs for hierarchical data structures, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the directory storage systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a hierarchy storage nodes that maintain hierarchical data structures or components of a transaction log store that maintain transaction logs for hierarchical data structures, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the hierarchy storage nodes or transaction log store described herein may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement embodiments described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    at least one processor; and
    a memory, storing program instructions that when executed by the at least one processor cause the system to implement a request handler for a hierarchical data store;
    wherein the request handler is configured to:
        receive an access request for an object of a hierarchical data structure that is stored in the hierarchical data store;
        access a schema applied to the hierarchical data structure to identify code associated with the object that is executed to process the access request for the object of the hierarchical data structure, wherein the code is identified according to an attribute in the schema specified via an interface for the hierarchical data store;
        cause execution of the code that generates an indication of an execution result for the code; and
        process the access request based, at least in part, on the indication of the execution result.

2. The system of claim 1, wherein the schema identifies a network endpoint for a remote execution platform for the code, and wherein to cause execution of the code, the request handler is configured to send a request to the network endpoint for the remote execution platform that invokes execution of the code, and wherein the request handler is further configured to receive the indication of the execution result from the remote execution platform.

3. The system of claim 1,
    wherein the program instructions further cause the system to implement a schema manager for the hierarchical data store, wherein the schema manager is configured to:
        receive the code as part of a request to access the schema; and
        store the code for inclusion in the schema, wherein the code is included in one or more classes of the schema, wherein the object is an instance of at least one of the classes of the schema; and
    wherein to cause execution of the code, the request handler is configured to provide the stored code to an execution platform.

4. The system of claim 1, wherein the hierarchical data store is a network-based directory storage service implemented as part of a provider network, wherein the access request is received from a client of the provider network, and wherein to cause execution of the code the request handler is configured to send a request to a code execution service implemented as part of the provider network, and wherein the indication of the execution result is received at the request handler from the code execution service.

5. A method, comprising:
    performing, by one or more computing devices:
        receiving, at a hierarchical data store, a request to access object of a hierarchical data structure stored in the hierarchical data store;
        identifying, by the hierarchical data store, code associated with the object in a schema applicable to the hierarchical data structure that is executed to process the request to access the object of the hierarchical data structure, wherein the code is identified according to an attribute in the schema specified via an interface for the hierarchical data store;
        initiating, by the hierarchical data store, execution of the code that generates an indication of an execution result for the code; and
        servicing the request to access the object based, at least in part, on the indication of the execution result.

6. The method of claim 5, further comprising:
    receiving, at the hierarchical data store, a request to include the code in the schema; and
    storing, by the hierarchical data store, the code for inclusion in the schema.

7. The method of claim 6, further comprising validating, by the hierarchical data store, the code prior to initiating the execution of the code.

8. The method of claim 5, wherein the schema identifies a network endpoint for a remote execution platform for the code, wherein the initiating execution of the code comprises sending a request to the network endpoint for the remote execution platform that invokes execution of the code, and wherein the method further comprises receiving the indication of the execution result from the remote execution platform.

9. The method of claim 5, wherein the execution of the code determines whether performance of the access request is valid according to one or more validation constraints.

10. The method of claim 9, further comprising receiving a request to include the one or more validation constraints in a class of the schema, wherein the object is an instance of the class.

11. The method of claim 5, wherein the execution of the code transforms a data value of the object from a first data format to a second data format.

12. The method of claim 5, wherein the access request is a request to create the object, update the object, or delete the object.

13. The method of claim 5, wherein the hierarchical data store is a network-based directory storage service implemented as part of a provider network, wherein the request to access the object is received from a client of the provider network, wherein initiating execution of the code comprises sending a request to a code execution platform implemented external to the provider network, and wherein the indication of the execution result is received from the external code execution platform.

14. A non-transitory, computer-readable storage medium, storing program instructions that when executed by one or more computing devices cause the one or more computing devices to implement:
   receiving, at a hierarchical data store, a request to access an object of a hierarchical data structure stored in the hierarchical data store;
   identifying, by the hierarchical data store, code associated with the object in a schema applicable to the hierarchical data structure that is executed to process the request to access the object of the hierarchical data structure, wherein the code is identified according to an attribute in the schema specified via an interface for the hierarchical data store;
   causing, by the hierarchical data store, execution of the code that generates an indication of an execution result for the code; and
   processing the request to access the object based, at least in part, on the indication of the execution result.

15. The non-transitory, computer-readable storage medium of claim 14, wherein the program instructions further cause the one or more computing devices to implement:
   receiving, at the hierarchical data store, a request to include the code in the schema;
   evaluating, by the hierarchical data store, validity of the code for execution, wherein the code is determined to be valid for execution; and
   storing, by the hierarchical data store, the code for inclusion in the schema.

16. The non-transitory, computer-readable storage medium of claim 15, wherein, in causing the execution of the code, the program instructions cause the one or more computing devices to implement providing the stored code to a code execution platform.

17. The non-transitory, computer-readable storage medium of claim 14, wherein the program instructions further cause the one or more computing devices to implement:
   receiving, at the hierarchical data store, another request to include other code in the schema;
   evaluating validity of the other code for execution, wherein the other code is determined to be invalid for execution; and
   denying, by the hierarchical data store, the other code for inclusion in the schema.

18. The non-transitory, computer-readable storage medium of claim 14, wherein the execution of the code transforms a data value of the object from a first data format to a second data format.

19. The non-transitory, computer-readable storage medium of claim 14, wherein the access request is a request to read one or more data values of the object.

20. The non-transitory, computer-readable storage medium of claim 19, wherein the execution of the code generates a default value for at least one of the data values, wherein the default value is returned in response to the read request.

* * * * *